United States Patent Office 2,978,937
Patented Apr. 11, 1961

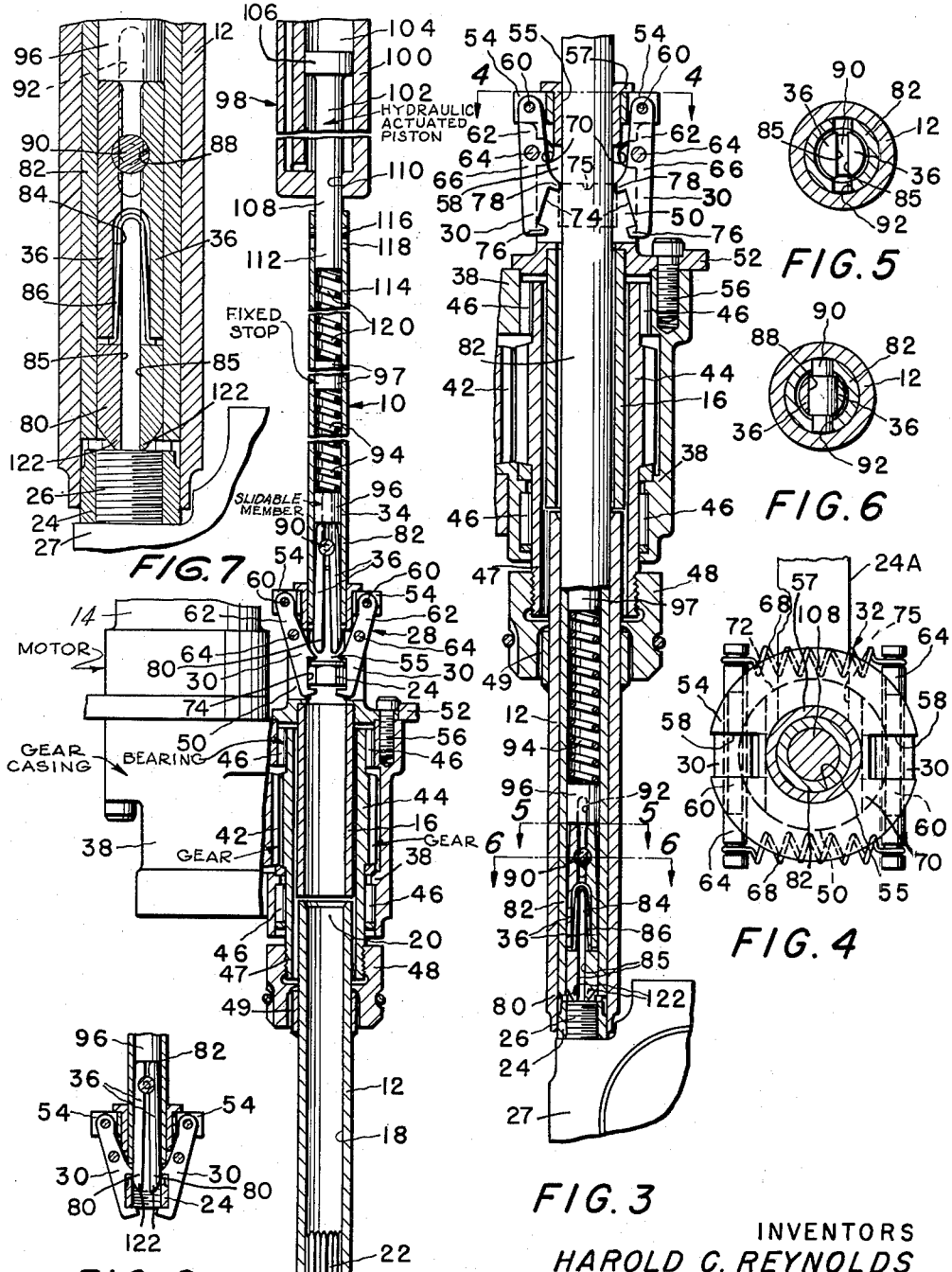

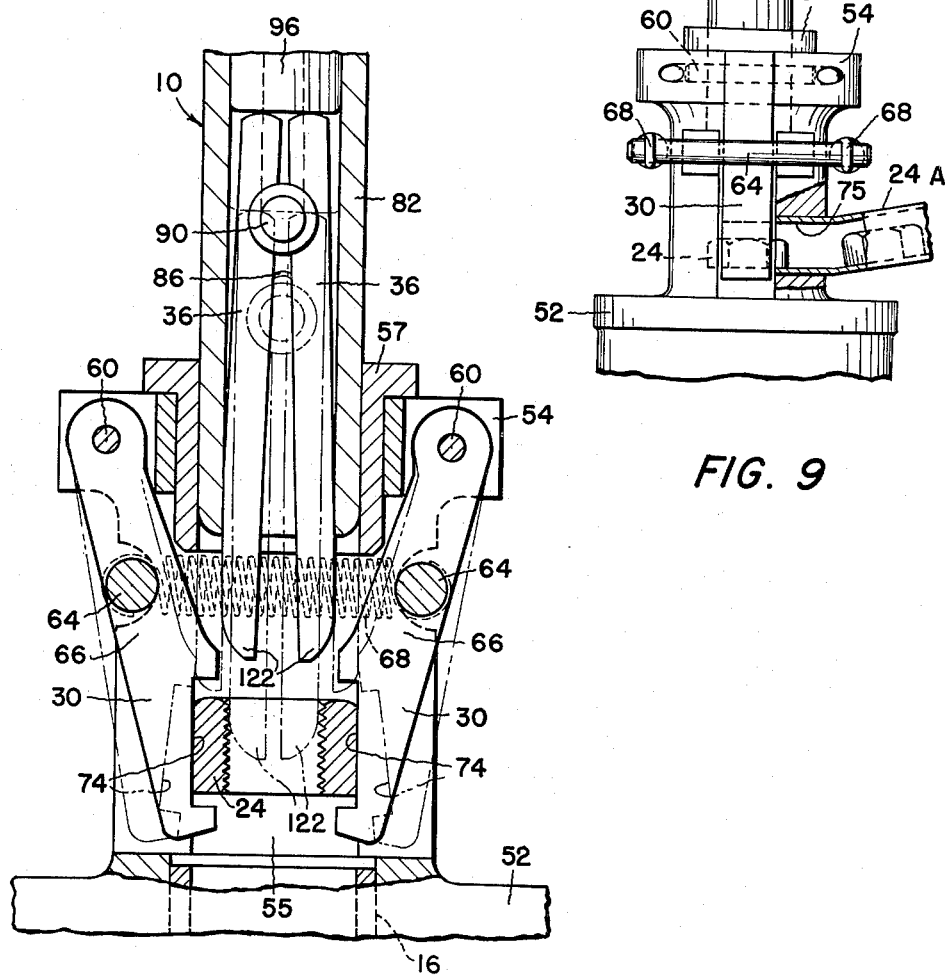

2,978,937
FEEDING AND RETAINING MECHANISM
Harold C. Reynolds and Richard W. Lees, Athens, Pa., and Anthony F. Gagne, Jr., Binghamton, N.Y., assignors to Ingersoll-Rand Company, New York, N.Y., a corporation of New Jersey
Filed Apr. 20, 1959, Ser. No. 807,637
9 Claims. (Cl. 81—53)

This invention relates to a feeding and retaining mechanism for a fastener element, and more particularly to such a mechanism associated with a rotatable member through which said element, such as a nut, is fed and attached thereby to a work piece, such as a bolt.

One object of this invention is to control the passage of an element through the member.

Another object of this invention is to prevent the element from being improperly attached to the work piece.

A further object of this invention is to prevent the element from falling out of the rotatable member.

Further objects will become obvious from the following specification and drawings in which:

Figure 1 is a longitudinal view, partly in section, of the feeding and retaining mechanism shown in combination with the rotatable member, Fig. 2 is a portion of the feeding and retaining mechanism shown in Fig. 1 showing the feeding device engaging a nut, Fig. 3 is an enlarged sectional view of the lower portion of Fig. 1 showing the nut being fastened to a bolt, Figs. 4, 5 and 6 are cross-sectional views of Fig. 3 taken along the lines 4—4, 5—5, 6—6, respectively, looking in the direction of the arrows, Fig. 7 is an enlarged sectional view of the lower portion of Fig. 3 showing the nut being fastened to a bolt, Fig. 8 is an enlarged view of the feeding and retaining mechanism shown in Fig. 1 and similar to Fig. 3, showing the actuation of the jaws to release the fastener element, and Fig. 9 is a fragmentary view of the retaining mechanism as viewed from the right in Fig. 1 showing the storage chute for feeding fastener elements to the retaining mechanism.

Referring to the drawings and first to Figure 1, 10 designates a feeding and retaining mechanism shown in axial alignment with the rotatable member 12, the latter driven by a motor 14 of a commonly known type and described in Patent No. 2,878,700, and a stationary chute 16 interposed between the member 12 and the mechanism 10.

The rotatable member 12 commonly called a feed-through socket is in the form of a hollow spindle having a longitudinal bore 18. The inlet end 20 of the bore 18 is in communication with the chute 16 and is adapted to receive a fastener element, such as a nut 24, therefrom. The outlet end 22 of the bore 18 has a conformation adapted to positively engage the nut 24 for rotation with the member 12. While the nut 24 is being rotated by the end 22 contact is made with an element, such as a bolt 26 connected to a work piece 27 shown in Fig. 3, and is threaded thereon.

The member 12 may not be properly positioned relative to the bolt 26 when the nut 24 is in the outlet end 22. In such a case, the nut 24 may fall out of the member 12 or may be improperly fastened to the bolt 26.

The present invention prevents this from occurring by having the mechanism 10 and associated parts operate in a manner as follows. The nuts 24 are conveyed from a storage chute 24A to a retainer 28 of such mechanism 10. The retainer 28 includes a pair of opposed jaws 30 that are constantly urged toward each other by spring means 32 (shown in Figs. 3 and 4) to releasably engage the nut 24. A feeding device 34 of the mechanism 10 includes a pair of arms 36 which are adapted to extend between the jaws 30 and into the nut 24 to grip or hold the nut 24. After the nut 24 is gripped by the arms 36, the tube 82 of the feeding device 34 cams the jaws 30 outwardly to disengage the nut 24 therefrom. The arms 36 then carry the nut 24 out of the retainer 28 and through the chute 16 and the member 12 to the outlet end 22 of the member 12 where such nut 24 is rotated until the member 12 is properly positioned over the bolt 26. Upon making proper contact between the nut 24 and bolt 26 the mechanism 10 releases its grip on the nut 24 and is retracted to ready itself for releasably gripping another nut 24.

Referring to the details of the invention, a portion of the rotatable member 12 is housed in a casing 38 and is driven through a gear train 42 (partly shown) by a motor 14 secured to the casing 38. The gear train 42 is contained in the casing 38 and includes a gear sleeve 44 which is supported by bearings 46 at the opposite ends thereof. The gear sleeve 44, encircling the stationary chute 16, extends forwardly of the chute 16 and encircles the rear end portion of the member 12. The forward end 47 of the sleeve 44 is threadedly connected to a nose piece 48 which in turn has a splined connection at 49 with the member 12. The gear sleeve 44, rotated by the motor 14, thus rotates around the stationary chute 16 to rotate the member 12.

The retainer 28 includes a cylindrical member 50 having a bore 55 extending longitudinally therethrough, see Figs. 3 and 4. The member 50 is provided with two annular flanges 52 and 54 at opposite ends thereof and has a pair of diametrically opposed slots 58 cut in the opposing walls of the member 50 and extending longitudinally from the upper end of the flange 52 to the upper end of the flange 54.

The longitudinal bore 55, including the interior of a bushing 57 in the rear end portion of the member 50, is in axial alignment with the chute 16 and the member 12, the bore 55 having a diameter adapted to slidably receive the mechanism 10, this relation to be explained hereinafter. The forward flange 52 is connected to the casing 38 and is secured thereto by cap bolts 56, see Figs. 1 and 3.

The jaws 30 are positioned in the slots 58, see Figs. 1, 3 and 4, the rear end portion 62 of the jaws 30 being pivotally connected in the slots of the flange 54 by pins 60 which extend through the rear end portion 62 of the jaws 30 and into the flange 54. The jaws 30 thus pivot around pins 60. The forward end of the jaws 30 are each provided with a recess 74 cooperating with each other to contain nuts 24 one at a time conveyed thereto through a storage chute (not shown). The forward and rear end portions of the recess 74 are defined by inwardly extending projections 76 and 78 of the jaws 30.

A storage chute 24A, shown in Figs. 4 and 9, extends into an opening 75 through the far side 72 of the member 50, see Figs. 3 and 4. The opening 75 is positioned at a level such that the nut 24 which is conveyed through the storage chute (not shown) may pass freely through such opening to be positioned in the recesses 74 of the jaws 30. The conveying and positioning of the nuts in the recesses 74 is achieved in a manner similar to that described in Patent No. 2,878,700.

In order to position the jaws 30 in a receiving position as shown in Fig. 1, the recessed end portions of the jaws 30 are constantly urged towards each other. To achieve this, spring means 32, see Fig. 4, is provided including a pair of pins 64 which extend through the mid-portion 66 of the jaws 30 and a pair of helical springs 68 interposed between the pins 64 and connected at their ends to the outer ends of said pins 64. The recessed end portions of the jaws 30, as shown in Fig. 1, are in an extreme inward position, the distance between the recesses 74 being such to receive and releasably hold a nut. As this distance is determined by the distance of inward travel of the pins 64, the distance of inward travel of the pins 64 is limited by the inner ends of recesses 70 formed in the opposing outer peripheries of the member 50, the recesses 70 positioned transversely of the slots 58, see Figs. 3 and 4.

In their receiving position (see Fig. 1), the feeding device 34 being retracted, the pins 64 being urged inwardly by the springs 68 until the mid portion of the pins abut the inward ends of the recesses 70, the jaws 30 are positioned such that the recesses 74 are spaced sufficiently to receive the nut 24.

The forward end of the jaws 30 with the recesses 74 is adjacent the rear end portion of the chute 16 which extends into the flange 52 and is held against rotation by being fitted snugly therein. The remaining portion of the chute 16 extends in spaced relation into the gear sleeve 44 with the forward end terminating immediately before the rear or inlet end 20 of the member 12.

The feeding device 34 includes a pair of arms 36 which are elongated with the outer surfaces being tapered inwardly at the forward ends 80 thereof, see Figs. 2, 3 and 7. The arms 36 are longitudinally movable in the forward end portion of the tube 82, the forward ends 80 being projectable from the forward end of the tube 82. The forward end portions of the arms 36 are spring pressed outwardly against the inner periphery of the tube 82, and when the forward ends 80 project from the forward end of the tube 82 they are forced outwardly, see Fig. 1, such that the breadth of the forward ends 80 is greater than the inner diameter of the tube 82. Accordingly, each of the arms 36 is provided with a groove 84 along the inner surfaces 85 of said arms 36 at the mid-portion thereof (see Figs. 3 and 7) for the reception of a hairpin spring 86 which constantly urges the arms 36 outwardly.

As the arms 36, being in a position as shown in Fig. 1, are moved forwardly by actuating means to be described hereinafter, the tapered forward ends 80 come into contact with the inner periphery of the nut 24 contained in the jaw recesses 74. The forward movement of the forward ends 80 into the nut 24 causes the arms 36 to move towards each other. The arms 36, by means of the spring 86, frictionally engage the nut 24. At the same time, the tube 82, positioned rearwardly of the forward ends 80 of arms 36, as shown in Fig. 2, comes into contact with the portion of the jaws 30 inclined rearwardly with respect to the longitudinal axis thereof and located rearwardly of the jaw projections 78, camming the jaws 30 outwardly in a position as shown in Fig. 3 and by the broken lines in Fig. 8. The nut 24 is released from the jaws 30 to permit the arms 36 to carry the nut 24 out of the recesses 74 in a forward direction.

Relative longitudinal movement is permitted between the tube 82 and said arms 36. The arms 36, being pivotable around a transverse pin 90, see Figs. 6 and 7, are provided with a transverse groove 88 at the opposed rear end portions of the inner surfaces 85 for the reception of the pin 90. The pin 90 extends through the groove 88 and through diametrically opposed slots 92 in the opposing walls of said tube 82. The length of the slots 92 is such to permit the arms 36 to move longitudinally relative to the tube 82 to be positioned projecting out of the tube, as shown in Fig. 1, and within the tube, as shown in Figs. 3 and 7. This structural arrangement is provided so that when the forward movement of the arms 36 is stopped by having tips 122 of the forward ends 80 of arms 36 abut the bolt 26 (see Figs. 3 and 7) the tube 82 can slide over said arms 36. In this manner, when the nut 24 comes into contact with the bolt 26 the arms 36 are urged towards each other by the forwardly moving tube 82 to disengage the arms from the properly aligned nut 24.

The arms 36 are constantly urged toward their forward limiting position by a spring 94 positioned between a freely slidable cylindrical member 96 and a stop member 97, the latter being secured to the tube 82, the member 96 being interposed between the spring 94 and the arms 36. In this manner the forward ends of the arms 36 are constantly urged out of the tube 82.

In addition to the already described structure, the device 34 includes actuating means 98 (partly shown in Fig. 1) for moving the feeding device 34 forwardly and rearwardly. The means 98 is preferably air actuated and includes a casing 100 which houses a piston 106 reciprocable in a longitudinal bore 104 in said casing 100. A rod 102 is connected at its rear end to the piston 106, the portion 108 of the rod 102 extending through a hole 110 in the forward end of the casing 100. The rod 102 is reciprocated by the piston 106 by alternately supplying and exhausting pressure fluid to and from opposite ends of the piston 106, as explained in Patent No. 2,878,700.

The forward end 112 of the rod 102 is slidably fitted in the rear end portion 114 of the tube 82 and is secured thereto by a pin 116. The pin 116 extends through the forward end 112 and into diametrically opposed slots 118 in the tube rear end portion 114. The length of the slots 118 is such to permit longitudinal relative movement between the rod 102 and tube 82. A spring 120 in the tube 82, positioned between the forward end 112 of the rod 102 and the fixed stop member 97, constantly urges the tube 82 toward its forward limiting position relative to the rod 102. This construction permits some forward over travel of the rod 102 without damage to the tube 82 or pin 116.

In the operation of the device, the components of the device being in a position as shown in Fig. 1, the nut 24 is conveyed into the recesses 74 of the jaws 30 which releasably engage it. At the same time, the rod 102 is actuated by the piston 106 in the forward direction in order to move the arms 36, which project forwardly of the tube 82, into frictional engagement with the inner periphery of the nut 24. When the nut 24 is engaged, the tube 82 continues moving forwardly, camming the jaws 30 outwardly to release the nut and to enable the arms 36 to carry the nut 24 into the chute 16 and therefrom into the member 12.

If the member 12 is properly placed over the bolt 26, the nut 24 will be brought into contact with the bolt 26 and will be threaded thereon by the member 12 which is rotated by motor 14 through gear train 42, see Figs. 3 and 7. With the nut 24 being fastened to the bolt 26 the tips 122 of the arms 36 come into contact with the upper end of the bolt 26 stopping the forward motion of the arms 36. However, the piston 106 continues moving forwardly so that the tube 82 moves forwardly sliding over the arms 36 to urge the forward ends of the arms towards each other until they are disengaged from the nut 24. The direction of movement of the piston 106 and rod 102 is then reversed carrying the tube 82 and arms 36 back through the member 12, chute 16 and jaws 30 to start the sequence again.

When the nut 24 is positively engaged by the outlet end 22 of the member 12 the nut can rotate relative to the arms 36. However, it is to be noted that the arms 36, tube 82 and rod 102 can be rotated by the end 22 through the nut 24 as they are not fixed against rotation.

If the member 12 is not properly positioned relative to the bolt 26, the tube 82 will not slide over the arms 36 to force them towards each other in order to disengage the latter from the nut 24 because the forward motion of the arms 36 is not stopped relative to the tube 82. In such event the nut 24 remains in the rotatable member 12 until the member 12 is properly positioned relative to the bolt 26. At such time the nut 24 is threaded on the bolt 26 as before described.

While I have shown and described a specific form of my invention, it is to be understood that various changes and modifications may be made without departing from the spirit of the invention as set forth in the appended claims.

We claim:

1. Apparatus for linearly feeding and axially rotating a fastener adapted to be connected to a fixed mating member by axial rotation of the fastener, comprising a housing having a forward portion and a rear portion, an elongated member having a forward end portion and a rear end portion, said elongated member having the forward end portion thereof mounted in the rear portion of the housing for slidable endwise movement through said housing, a hollow elongated member having a forward end portion and an opposite rear end portion, said hollow elongated member being connected at the rear end portion in the forward portion of said housing for rotation about the longitudinal axis thereof and disposed in spaced endwise, coaxial relationship to said elongated member, the forward end portion of said hollow elongated member being disposed with said fixed mating member within the forward end portion thereof, said elongated member being dimensioned for slidable longitudinal movement within said housing and said hollow elongated member, means for actuating said elongated member for linear movement within said housing and said hollow elongated member toward and away from said fixed mating member, second means for imparting to said hollow elongated member rotation about its longitudinal axis, jaw means within said housing in the space between adjacent ends of said elongated member and the hollow elongated member for receiving and holding said fastener against movement, said housing having an opening therein to permit entry of a fastener into engagement with said jaw means, said jaw means including means for mounting the jaw means for movement toward the fastener to hold the same and away from the fastener to release the latter, a feeding means carried by the forward end portion of said elongated member and constructed to engage and hold said fastener upon forward linear movement of the elongated member relative to said housing in a direction toward said fixed mating member, the forward end portion of said elongated member cooperating with said jaw means upon forward linear movement of the elongated member and after the feeding means engages the fastener to cause the jaw means to move away from the fastener to release the latter and permit the fastener to be carried by said feeding means through the housing and the hollow elongated member to the fixed mating member, and third means in said hollow elongated member for engaging said fastener to rotate the latter about its axis to connect the fastener to said fixed mating member.

2. Apparatus for linearly feeding and axially rotating a fastener adapted to be connected to a fixed mating member by axial rotation of the fastener, comprising a housing having a forward portion and a rear portion, an elongated member having a forward end portion and a rear end portion, said elongated member having the forward end portion thereof mounted in the rear portion of said housing for slidable endwise movement through said housing, a hollow elongated member having a forward end portion and opposite rear end portion, said hollow elongated member being connected at the rear end portion in the forward portion of said housing for rotation about the longitudinal axis thereof and disposed in spaced endwise, coaxial relationship to said elongated member the forward end portion of said hollow elongated member being disposed with said fixed mating member receivable in the forward end portion thereof, said elongated member being dimensioned for slidable longitudinal movement within said housing and said hollow elongated member, means for actuating said elongated member for linear movement within said housing and said hollow elongated member toward and away from said fixed mating member, second means for imparting to said hollow elongated member rotation about its longitudinal axis, a plurality of jaws disposed in the housing in the space between adjacent ends of said elongated member and said hollow elongated member, said housing having an opening therein to permit entry of said fastener into the housing and into engagement with said jaws, said jaws being pivotally connected in juxtaposed relation to each other and biased toward each other to grip therebetween said fastener and prevent movement of the latter, a feeding means carried by the forward end portion of said elongated member and constructed and arranged to engage and hold said fastener upon linear movement of the elongated member relative to said housing in a direction toward said fixed mating member, the forward end portion of said elongated member being effective upon forward linear movement of the elongated member and after feeding means engages the fastener to impinge said jaws and cause the jaws to be pivoted away from said fastener to release the latter and permit the fastener to be carried by said feeding means through the housing and the hollow elongated member to the fixed mating member, and third means in said hollow elongated member for engaging said fastener to rotate the latter about its axis to connect the fastener to said fixed mating member.

3. Apparatus for linearly feeding and axially rotating a fastener adapted to be connected to a fixed mating member by axial rotation of the fastener, comprising a retainer housing having a forward portion and a rear portion, a first hollow elongated member having a forward end portion and a rear end portion, said first elongated member having the forward end portion mounted within the rear portion of the retainer housing for slidable endwise movement therein, a second hollow elongated member having a forward end portion and a rear end portion, said second member being connected at the rear end portion in the forward portion of said housing for rotation about the longitudinal axis thereof and disposed in spaced endwise, coaxial relationship to said first elongated member, the forward end portion of said second elongated member being disposed with said fixed mating member receivable in the forward end portion thereof, said first elongated member being dimensioned for slidable longitudinal movement within said housing and said second hollow elongated member, means for slidably moving said first elongated member within said housing and said second elongated member toward and away from said fixed mating member, second means for rotating said first elongated member about its longitudinal axis, a plurality of jaws disposed in said housing in the space between the forward end portion of said first elongated member and the rear end of the second elongated member, said housing having an opening therein to permit entry of a fastener into the housing and into engagement between said jaws, said jaws being pivotally connected in juxtaposed relation to each other and biased toward each other to grasp therebetween said fastener and prevent movement of the latter, a feeding means carried in the forward end portion of said first hollow elongated member and adapted to engage and hold said fastener upon initial forward longitudinal movement of the first elongated member relative to said retainer housing in a direction toward said fixed mating member, the forward end portion of said first elongated member being effective upon further longitudinal movement after the feeding means engages the fastener to cause the jaws to be pivoted away from said fastener to release the latter and permit said fastener to be carried by said feeding means and first elongated member through the retainer housing and second elongated member to the fixed mating member, and means in said second elongated member for engaging said fastener to rotate the latter about its axis to connect the fastener to said fixed mating member.

4. Apparatus for linearly feeding and axially rotating a fastener adapted to be connected to a fixed mating member by axial rotation of the fastener, comprising a retainer housing having a forward portion and a rear portion, a first tubular member and a second tubular member each having a forward end portion and an opposite rear end portion, the first tubular member being slidably mounted at the forward end portion thereof within the forward portion of said retainer housing, the second tubular member being connected for rotation about its longitudinal axis at the rear end portion thereof in the forward portion of said retainer housing, said first and second tubular members being disposed within said housing in spaced endwise relationship and in coaxial relationship with each other, said second tubular member being positioned with the fixed mating member being receivable in the forward end portion of the second tubular member, said first tubular member being dimensioned for longitudinal movement within the housing and the second tubular member, means connected to said first tubular member for linearly slidably moving said first tubular member within said housing and second tubular member toward and away from said fixed mating member, gear means within said housing for rotating said second tubular member about the longitudinal axis thereof, a plurality of jaws disposed in said housing in the space between the adjacent ends of the first and second tubular members, said housing having an opening therein to pass said fastener into the housing and between said jaws, said jaws being pivotally secured in juxtaposed relation to each other and biased toward each other to grasp therebetween said fastener, a feeding means disposed in the forward end portion of said first tubular member and projecting forwardly of the end of said first tubular member, and constructed and arranged to engage and hold said fastener upon initial forward longitudinal movement of the first tubular member relative to said housing, the forward end portion of the first tubular member being dimensioned to impinge against said jaws upon further forward longitudinal movement of said first tubular member to pivotally force the jaws away from the fastener to release the latter and permit said fastener to be carried by said feeding means and first tubular member through the housing and second tubular member to the fixed mating member, and means in said second tubular member for engaging said fastener to rotate the latter about its axis to secure the fastener to said fixed mating member.

5. The apparatus of claim 4 wherein said fastener is provided with an opening in the rear end thereof and said feeding means comprises two arms receivable in the opening of said fastener, said arms being biased away from each other to cause the arms to frictionally engage the inner surface of said fastener defined by said opening to hold said fastener for linear movement.

6. The apparatus of claim 4 wherein each of said jaws is so formed as to prevent forward movement of said fastener as said feeding means engages said fastener.

7. Apparatus for linearly feeding and axially rotating a nut to be turned upon a threaded stud, comprising a retainer housing having a forward portion and a rear portion, a first tubular member and a second tubular member each having a forward end portion and an opposite rear end portion, the first tubular member being mounted at the forward end portion thereof within the forward portion of said retainer housing, the second tubular member being connected for rotation about the longitudinal axis thereof at the rear end portion thereof in the forward portion of said retainer housing, said first and second tubular members being disposed within said housing in spaced endwise, coaxial relationship with each other, said second tubular member being disposed with the stud being receivable in the forward end portion of the second tubular member, said first tubular member being dimensioned for longitudinal movement within the housing and the second tubular member, means connected to said first tubular member for linearly slidably moving said first tubular member within the housing and second tubular member toward and away from said stud, means within said housing for rotating said second tubular member about the longitudinal axis thereof, a plurality of jaws disposed in said housing in the space between the adjacent ends of the first and second tubular members, said jaws being pivotally secured to said housing opposite each other and biased toward each other to grasp therebetween said nut, said housing having an opening therein to pass said nut into the housing and between said jaws, a plurality of arms pivotally secured within the forward end portion of said tubular member and projecting beyond the plane of the forward end of said tubular member, said arms being biased away from each other and having distal end surfaces formed for camming the arms together when the end surfaces impinge the nut as the arms enter the opening in said nut upon initial forward longitudinal movement of said first tubular member, the jaws being positioned and proportioned to lie in the path of linear movement of said first tubular member so that upon further forward movement of said first tubular member the forward end thereof impinges the jaws and forces the latter away from each other to release the nut and allow the arms to carry the nut to the stud through the housing and second tubular member, and means in said second tubular member to engage the nut and cause the nut to be rotated by rotation of said second tubular member.

8. The apparatus of claim 7 wherein said arms are mounted for slidable movement relative to said first tubular member so that when the distal ends of the arms contact the stud the first tubular member is permitted to move forward relative to the arms thereby forcing the distal ends of the arms together and releasing the arms from engagement with the nut.

9. The apparatus of claim 7 wherein said arms are mounted for slidable movement relative to said first tubular member and are biased toward said forward end of said tubular member to prevent relative movement of the arms and the first tubular member when the arms engage the nut.

References Cited in the file of this patent

UNITED STATES PATENTS

| | | |
|---|---|---|
| 1,343,667 | Evensen | June 15, 1920 |
| 1,676,775 | Doherty | July 10, 1928 |
| 2,594,321 | Leftwich | Apr. 29, 1952 |
| 2,607,252 | Shaff | Aug. 19, 1952 |
| 2,676,506 | Schultz | Apr. 27, 1954 |
| 2,878,700 | Reynolds | Mar. 24, 1959 |